United States Patent [19]
Jesse et al.

[11] Patent Number: 5,324,354
[45] Date of Patent: Jun. 28, 1994

[54] PIGMENT FORMULATIONS CONTAINING A PIGMENT, A COLORANT HAVING AN EXTERNAL BASIC GROUP AND A SURFACTANT

[75] Inventors: Joachim Jesse, Weisenheim; Juan A. Gonzalez Gomez, Muenster-Hiltrup; Gustav Bock, Neustadt; Paul Guenthert, Schifferstadt, all of Fed. Rep. of Germany

[73] Assignee: BASF Aktiengesellschaft, Ludwigshafen, Fed. Rep. of Germany

[21] Appl. No.: 742,502

[22] Filed: Aug. 5, 1991

Related U.S. Application Data

[63] Continuation of Ser. No. 515,841, Apr. 27, 1990, abandoned.

[30] Foreign Application Priority Data

Apr. 29, 1989 [DE] Fed. Rep. of Germany ....... 3914384

[51] Int. Cl.$^5$ .............................................. C09B 67/50
[52] U.S. Cl. ................... 106/413; 106/22 R; 106/402; 106/404; 106/460; 106/494; 106/495; 106/496; 106/503
[58] Field of Search ................ 106/22, 402, 404, 413, 106/460, 494, 495, 496, 503; 524/779; 534/604

[56] References Cited

U.S. PATENT DOCUMENTS

| | | | |
|---|---|---|---|
| 3,764,360 | 10/1973 | Langley et al. | |
| 3,915,634 | 10/1975 | Pariser. | |
| 4,167,420 | 9/1979 | Linden et al. | 106/460 |
| 4,247,338 | 1/1981 | Ziobrowski | 106/433 |
| 4,298,526 | 11/1981 | Sappok et al. | 106/412 |
| 4,317,682 | 3/1982 | Katsura et al. | 106/460 |
| 4,350,534 | 9/1982 | Fechner et al. | 106/413 |
| 4,350,535 | 9/1982 | Ishijima et al. | 106/404 |
| 4,456,485 | 6/1984 | Iyengar | 106/408 |
| 4,461,647 | 7/1984 | Schofield et al. | 106/494 |
| 4,490,177 | 12/1984 | Shioi et al. | 106/404 |
| 4,634,552 | 10/1987 | Canestri | 252/356 |
| 4,664,715 | 5/1987 | Jesse | 106/402 |
| 4,692,189 | 9/1987 | Bäbler et al. | 106/494 |
| 4,704,165 | 11/1987 | Nakamura et al. | |
| 4,720,304 | 1/1988 | Ruff et al. | 106/494 |
| 4,764,217 | 8/1988 | von der Crome et al. | 106/494 |
| 4,864,324 | 9/1989 | Shirota et al. | 106/22 |
| 4,872,916 | 10/1989 | Latosky | 106/503 |
| 4,894,183 | 1/1990 | Töpfl et al. | 252/358 |
| 4,927,463 | 5/1990 | Kloetzeret et al. | 106/461 |
| 4,986,851 | 1/1991 | Dietz et al. | 106/503 |

FOREIGN PATENT DOCUMENTS

| | | |
|---|---|---|
| 189385 | 7/1986 | European Pat. Off. |
| 2103030 | 7/1971 | Fed. Rep. of Germany. |
| 2851752 | 6/1980 | Fed. Rep. of Germany. |

Primary Examiner—Anthony Green
Assistant Examiner—Scott Hertzog
Attorney, Agent, or Firm—Oblon, Spivak, McClelland, Maier & Neustadt

[57] ABSTRACT

Pigment formulations contain a) a finely divided pigment, b) at least one colorant which has at least one external basic group, c) at least one acidic and/or neutral phosphoric ester and d) if required, further assistants conventionally used in such formulations. The formulations are used for pigmenting printing inks and lakes.

The printing inks, pastes and lakes produced using the formulations have substantially better flow behavior than the inks and lakes obtained using prior art pigments.

5 Claims, No Drawings

PIGMENT FORMULATIONS CONTAINING A PIGMENT, A COLORANT HAVING AN EXTERNAL BASIC GROUP AND A SURFACTANT

This application is a continuation of application Ser. No. 07/515,841, filed on Apr. 27, 1990, now abandoned.

In the preparation of printing inks, it is becoming increasingly common to grind the pigments in relatively high concentration. Furthermore, base pastes, ie. low-binder or even binder-free dispersions of the pigments in mineral oil, toluene or other solvents, having a high concentration of the pigments, are more and more frequently being prepared first. These concentrates are then converted into a lake with the various binders or concentrated binder solutions, to give printing inks. Grinding at high concentrations sets high requirements with regard to the flow behavior of the printing inks or base pastes which, the higher the pigment concentration at which grinding is to be carried out, are all the more difficult to meet in the case of the most commonly used organic colored pigments, such as Pigment Blue 15, Pigment Red 57 and Pigment Yellow 12 or 13.

By coating the pigments with surfactants, however, it is possible to obtain pigment formulations which can be processed to give printing inks having better flow properties or to give pumpable base pastes having a high pigment concentration.

EP-A-189385 describes a dispersant which permits coating of the pigments in aqueous suspension. Using the coated pigments, it is possible to prepare dispersions having a lower viscosity and a higher solids concentration than in the case of the corresponding uncoated pigments. The pigments may be coated with the dispersants alone or with combinations of the dispersants and other substances which have a synergistic effect with the dispersants. However, the flow-improving effect of the dispersants described in EP-A-189385 is not sufficient in all cases. Although the flow behavior of the printing inks, coatings and pastes prepared using the pigment formulations of EP-A-189385 can be improved by means of increasing amounts of dispersants, the color strength decreases depending on the content of colorless additives (assistants).

In order to obtain printing inks, lakes and pastes having better flow properties and hence to improve the cost efficiency of the preparation of such inks, there is a need for more effective additives whose use leads to little or no reduction in color strength.

It is an object of the present invention to provide pigment formulations which can be processed to give printing inks or base pastes having improved flow properties.

We have found that this object is achieved by pigment formulations which contain
a) a finely divided pigment,
b) from 1 to 20% by weight, based on the formulation, of at least one colorant which has at least one external basic group,
c) from 3 to 30% by weight, based on the formulation, of at least one phosphoric ester from the group consisting of dialkyl, trialkyl, diaryl, triaryl and alkylaryl phosphates or from the group consisting of the acidic or neutral phosphoric esters based on fatty alcohol/ethylene oxide adducts, fatty alcohol/propylene oxide adducts, polypropylene glycol, polyethylene glycol or of block copolymers based on propylene oxide and ethylene oxide, and
d) if required, further assistants conventionally used in pigment formulations.

The formulations of the invention give printing inks, lakes and base pastes which, compared with printing inks, lakes and pastes prepared using uncoated pigments, have substantially better flow properties and little or no reduction in color strength. Furthermore, the colorations obtained using these inks have higher gloss and improved transparency.

Colorants which have at least one external basic group are preferably of the general formula (I)

$$F{-}Z{-}X]_n \qquad (I)$$

where F is an n-valent dye radical, Z is a bridge member, X is a secondary, tertiary or quaternary basic group and n is 1-4.

F is an n-valent dye radical which may be derived from colorants ranging from water-soluble to water-insoluble. F is preferably derived from colorants whose hues are similar or identical to those of the pigments (a) present in the formulations.

F is derived from, for example, monoazo or bisazo dyes, from quinophthalone, from indigoids, from phenyl-containing anthraquinone dyes, from carbonyl dyes having a relatively high degree of fusion, from carbonyl-containing dyes, such as quinacridone and its derivatives, from phthalocyanines and from perylene-3,4,9,10-tetracarboxylic acid diimides and naphthalene-1,4,5,8-tetracarboxylic acid diimides, and F may carry a sulfo group.

Particularly preferred formulations are those in which F is derived from sparingly soluble to insoluble dyes or from pigments, in particular from the pigments used as (a) or from compounds from this group.

The bridge member Z is preferably of the formula (II)

$$-Y-(CH_2-)_m \qquad (II)$$

where Y is $(-CH_2-)_p$, $-SO_2-$ or $-CO-$, A is a chemical bond, $-O-$, $-NH-CO-$, $-COO-$ or

$$-\overset{|}{N}-R^1,$$

in which $R^1$ is H, $C_1-C_{20}$-alkyl or alkoxyalkyl having a total of 3 to 5 carbon atoms, p is from 1 to 6 and m is from 0 to 6.

X is advantageously a secondary or tertiary amino group, a quaternary ammonium group or a basic 5-membered or 6-membered heterocyclic structure in particular an unsubstituted or substituted imidazole radical.

X is preferably a radical of the formulae

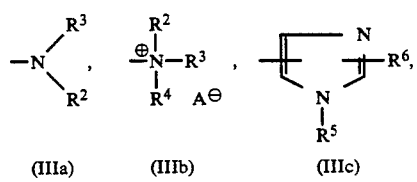

(IIIa)  (IIIb)  (IIIc)

-continued

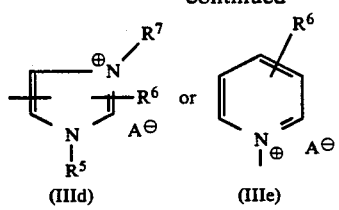

(IIId)   (IIIe)

where $R^3$ and $R^2$ independently of one another are each H, $C_1$-$C_{20}$-alkyl, alkoxyalkyl having a total of 3 to 8 carbon atoms, $C_2$-$C_{18}$-hydroxyalkyl or $C_3$-$C_{18}$-alkenyl, or one of the radicals $R^3$ or $R^2$ is benzyl or phenyl which is unsubstituted or substituted by $C_1$-$C_4$-alkoxy, $C_1$-$C_4$-alkyl or alkoxyalkyl having a total of 3 to 8 to carbon atoms, $R^5$ and $R^6$ independently of one another are each H or $C_1$-$C_4$-alkyl, $R^7$ is $C_1$-$C_4$-alkyl or hydroxy-$C_2$-$C_4$-alkyl and $A^\ominus$ is one equivalent of an anion.

Specific examples of suitable colorants which carry an external base group are:

a) from the series consisting of the phthalocyanines

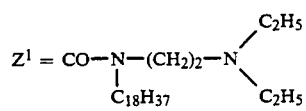
(IVa)

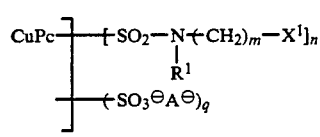
(IVb)

(IVc)

(IVd)

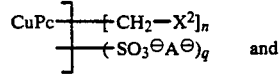
(IVe)

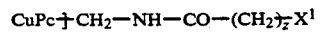
(IVf)

where $X^1$ is a radical of the formula (IIIa) or (IIIb), $X^2$ is a radical of the formula (IIIc), (IIId) or (IIIe), n is from 1 to 4, q is 0, 1 or 2 and $1 \leq (n+q) \leq 4$;

b) from the series consisting of the azo dyes:

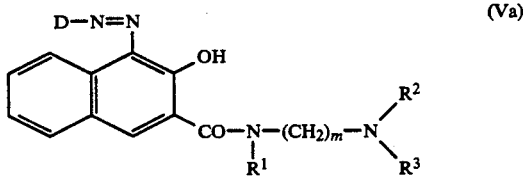
(Va)

where D is the radical of a diazo component and $R^1$ has the abovementioned meaning, or

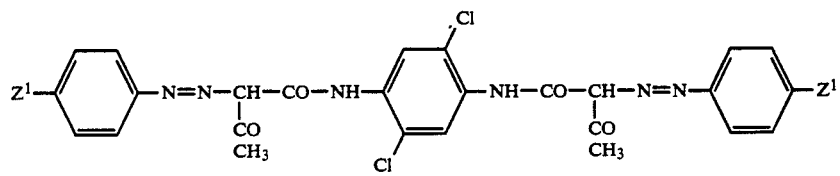
(Vb)

c) from the series consisting of the quinophthalones:

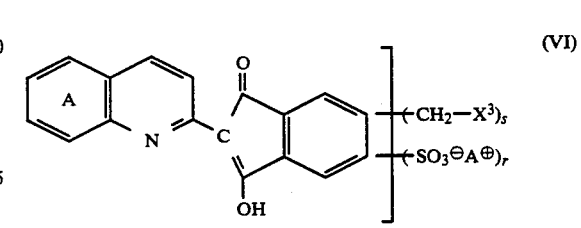
(VI)

where X is a radical of the formula (IIIc) or (IIId), r is 0 or 1 and s is 1 or 2;

d) from the series consisting of the dioxazine pigments, e.g.

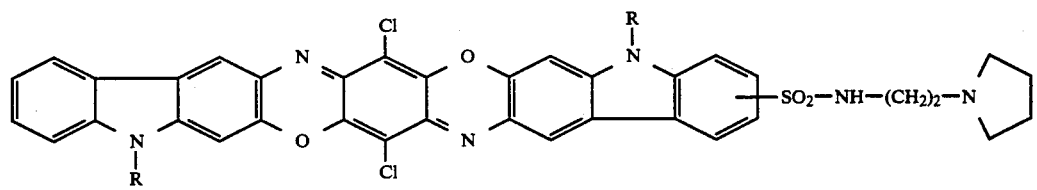
(VII)

R = $C_1$-$C_4$-Alkyl e) from the series consisting of the quinacridones, e.g.

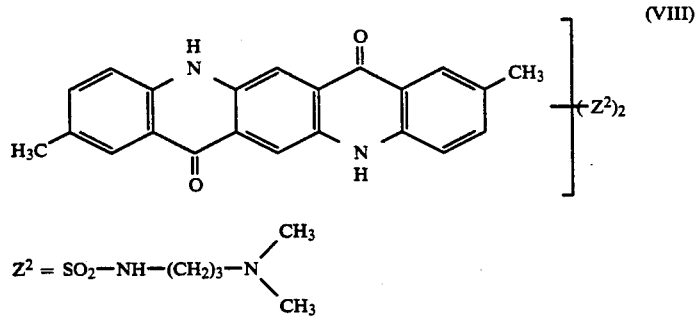

f) from the series consisting of the fused carbonyl dyes, e.g.

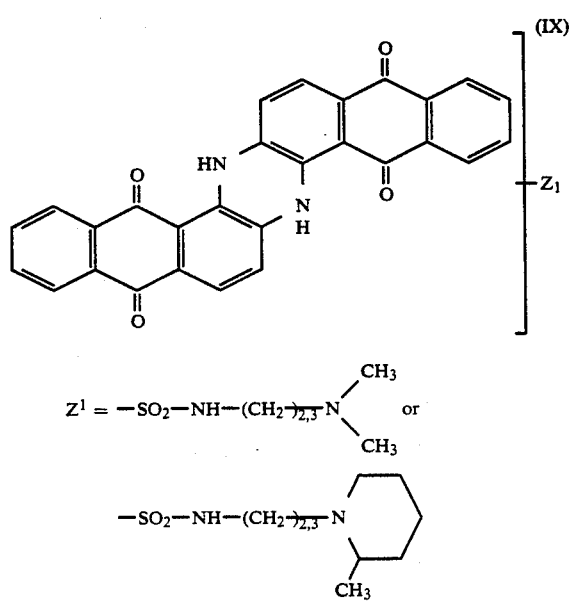

g) from the series consisting of the indigoids, e.g.

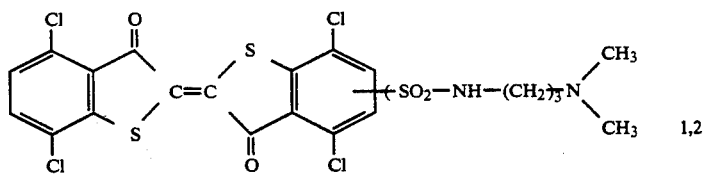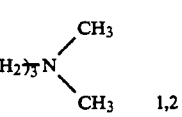

The agents (c) serve as dispersants. Dialkyl, diaryl, trialkyl and alkylaryl phosphates and acidic and neutral phosphoric esters based on fatty alcohol/EO adducts, on fatty alcohol/propylene oxide adducts, on polyethylene glycol, on polypropylene glycol or on block copolymers based on propylene oxide and ethylene oxide are suitable for (c). Specific examples of (c) are:

i) dialkyl and trialkyl phosphates, such as di- and trinonyl phosphate, d-2-ethylhexyl phosphate, di- and triisobutyl phosphate, mono- and di-$C_6$-$C_{10}$-alkyl phosphate having straight-chain or branched alkyl radicals;

ii) di- and triaryl phosphates, such as di- and triphenyl phosphate, and di- and tricresyl phosphate;

iii) alkylaryl phosphates, iv) acidic and neural phosphoric esters based on EO and PO adducts, such as di- and triesters with $C_{13}$-$C_{15}$-oxoalcohol + PO + EO di- and triesters with $C_{13}$-$C_{18}$-fatty alcohol/EO adducts having from 1 to 20 units of EO mono- and diesters of polyethylene glycol with phosphoric acid;

v) mono-, di- and triesters of hydroxy-terminated polyesters, such as polyhydroxystearic acid.

Phosphoric esters suitable for (c) are commercially available, for example, under the names Lutensit® A-EP, Korantin® SMK and LKB, Primasol® NF 100, (all from BASF), Degressal® SD 40 (Degussa), Plysurf® A 207 H, A 208 B, A 212 C, A 212 E, A 217 E and A 219 B (DKS International Inc.), Gafac RS 610 and RS 710 (GAF Corp.), Knapsack phosphoric esters 122, 124, 158, 123, 185, 215, MDAH, MDIT, MOB, MDB, MDL and MDST.

The pigment formulations contain from 1 to 20% by weight of the colorants (b) containing external basic groups and from 3 to 30% by weight of the agents (c) acting as dispersants, the percentages being based on the formulation.

Preferred formulations are those which contain from 3 to 15% by weight of (b) and from 5 to 20% by weight of (c).

Examples of other suitable agents (d) conventionally used in pigment formulations are abletic acid, resinares and rosin and its modifications. The amount of these agents may be up to 50% by weight, based on (a).

The agents (d) and their use form part of the prior art and are familiar to the skilled worker knowledgeable in this area.

The formulations can be prepared by mechanical mixing of the components (a), (b), (c) and (d).

Advantageously, (b) is added to the pigment (a) as a dispersion or in solution before, during or after the finish, or added before, during or after coating of the pigment with surfactants, such as resins, etc.

The agents (c) acting as dispersants are added to the pigment suspension either directly or in the form of solutions.

However, it is also possible first to add (c) to (b) and then to add the resulting mixture to the pigment or to the pigment suspension.

Coating of the pigments may be effected in the suspension obtained in the synthesis or during the finish.

However, it is also possible first to isolate the pigment and then to resuspend it in water or a mixture of water and organic solvents, for coating with (b), (c) and (d).

Coating with (b), (c) and (d) may be carried out at room temperature or a higher temperature, for example up to 100° C.

The coated pigment is isolated in a conventional manner from the suspension by filtration. The residue can be dried.

The water-moist residue can, however, also be converted directly into concentrated printing inks by flushing.

Where the crude pigment is comminuted before finishing by milling, for example in ball mills or similar intensive malls, components (b) and (c), as such or in the form of the additive combination obtainable by reacting (precipitating) (b) with (c), can be added to the crude pigment before, during or after milling.

In this case, pigment formulations which give printing inks, lakes and base pastes having particularly good flow properties are obtained, and this procedure is therefore particularly preferred.

The formulations can also be obtained in the form of base pastes or low-binder concentrates by incorporation of the pigments (a) with the agents (b) and (c) or of (a) with the additive combination of (b) and (c) and, if required, (d) in solvents or mineral oil.

These base pastes/concentrates can then be diluted to give printing inks or lakes.

Compared with the untreated pigments, the novel formulations have substantially better coloristic, theological and printing properties. The advantage of the novel formulations is the combination of good flow behavior of the printing ink or of the base paste in conjunction with high transparency and good gloss of the prints. In many cases, it is possible to prepare printing inks or base pastes having substantially better flow properties and no reduction in color strength compared with pigments prepared using the dispersant of EP-A-189395.

The Examples which follow illustrate the various combinations, the type and amount of the additives and the different coating conditions.

A. Printing inks and testing of these inks

The resulting formulations and comparisons were processed to printing inks as described below and these inks were tested.

A1 Offset printing ink

The pigments were stirred into a varnish of 38 parts of maleate resin (Alresat ® SKA from Albert, Wiesbaden), 42 parts of lacquer linseed oil and 20 parts of mineral oil PKWF 6/9 (from Haltermann, Hamburg) and then predispersed using a Dispermat dissolver (toothed 25 disk of 3 cm diameter, 12,000 rpm) for 10 minutes at 70° C. The ink was then ground three times on an SDY 200 Bühler roll mill heated at 35° C., under a roll pressure of 15 bar.

The pigment concentration is stated in the Examples. The flow characteristics are determined according to A3.

A2 Determination of the transparency of offset inks

The offset ink prepared according to A1 was diluted to a pigment content of 10% by adding a binder solution (Alkydal ® F 681, 75% strength solution in gasoline, Bayer AG) under a load of 25 kg and mixed in a disk mill (Engelsmann). The mixture was applied to contrast cardboard (black-white) in a 100 μm thick layer using the Erichsen film caster, 8 drops of the drying agent Octa Soligen cobalt (1.7%), lead (15.7%) liquid (Hoechst) being mixed with the mixture on the grinding plate directly before application. The transparency was matched visually.

A3 Evaluation of the flow behavior of the offset printing inks

The flow behavior of the offset printing inks was determined by the flow plate method. To produce the flow plate, a well-like indentation of 10 mmwas drawn on a 25×6 cm deep-drawing sheet using the Erichsen deep-drawing apparatus. The mid-point of this indentation is stage 1. Marks corresponding to the ratings 2 to 5 are made at 40 mm intervals along the edge of the plate.

3 g of the offset ink to be measured were weighed into the indentation of the initially horizontal plate. After storage for 30 minutes, the plate was suspended vertically in a conditioned room so that the ink could flow downward. Printing inks which did not exhibit flow after storage received the rating 1. The printing inks were measured after 5, 10 and 60 minutes. Systems which tended to exhibit thixotropy during storage were suspended vertically directly after the printing ink had been weighed in. The time taken to reach the individual evaluation stages was then measured.

A4 Halftone gravure printing ink 4.1 The pigments were milled in a 35% strength solution of a rosin-modified phenol resin (Albertol ® KP 670 from Reichhold-Albert-Chemie AG) in toluene (viscosity adjusted to 14 sec, measured using a 4 mm DIN cup) with a Red Devil ® for 60 minutes. The pigment concentration is stated in each case in the Examples.

4.2 The flow behavior was measured for the printing inks which had been stored overnight at 20° C., using the DIN cup with a 4 mm nozzle.

4.3. The gloss was determined at 60° using the Byk-Mallinckrodt pocketgloss apparatus, for colorations obtained by applying the ink to halftone paper using a 6 μm Erichsen coil coater.

A5 Nitrocellulose printing inks 5.1 The pigments were ground in a nitrocellulose varnish consisting of 17.5 parts of nitrocellulose A 400 chips, 20 parts of ethyl acetate and 62.5 parts of ethanol, using the Red Devil, for 60 minutes. The pigment concentration is stated in the Examples.

5.2 The transparency was determined visually for coatings on transparent film and aluminum foil (12 μm Erichsen coil coater).

5.3 The gloss was measured for colorations on transparent film at 60° using the Byk-Mallinckrodt pocketgloss apparatus.

B. Illustrative Examples

EXAMPLE 1 (Formulation 1)

105 g of the copper phthalocyanine prepared according to DE-A-28 51 752, Example 1a, were finished similarly to Example 2 of the DE-A. Before the pigment was isolated, the suspension was diluted with 2 l of water (room temperature), and 4.5 g of the CuPc (1) having external basic groups and in the form of the aqueous press cake and 6 g of an acidic phosphoric ester which contained, as the ester group, a product obtained by reacting a $C_{13}$–$C_{15}$-oxoalcohol mixture with 6 moles of PO and then with 12 moles of EO per mole of alcohol were added with stirring.

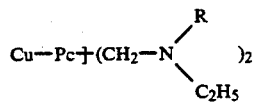

(1)

CuPc = Copper phthalocyanine, mixture of compounds in which R is H and $C_2H_5$, which contains 0.1 sulfo group on average.

The suspension was stirred for 1 hour without heating. The pigment formulation was then isolated, dried and milled.

EXAMPLE 2 (Formulation 2)

The procedure described in Example 1 was followed, except that 9 g of basic CuPc (1) in the form of the aqueous press cake and 12 g of the acidic phosphoric ester stated in Example 1 were added to the finished pigment.

The pigment formulations obtained according to Examples 1 and 2 give offset printing inks which have pigment contents of 18% and exhibit very good flow. The flow plate values are stated in Tables 1 and 2.

COMPARATIVE EXAMPLE 1 (Comparison 1)

100 g of CuPc pigment in the form of the aqueous press cake (prepared according to DE-A-28 51 752, Example 2) were suspended in 2.5 l of water (25° C.) for 2 hours. Thereafter, 5 g of (1) (cf. Example 1) in the form of the aqueous press cake were added and the mixture was stirred for a further hour. The formulation (Comparison 1) was filtered off under suction, dried and milled.

COMPARISON 2

The uncoated CuPc pigment obtainable according to DE-A-28 51 752, Example 2.

When the pigments of Comparisons 1 and 2 were used as stated in Examples 1 and 2, the same amount of pigment gave offset printing inks which showed very poor flow (Comparison 1) or none at all (Comparison 2) on the flow plate. The offset printing inks obtained with pigment formulations 1 and 2 gave colorations (obtained by applying the ink to contrast cardboard with a 150 μm coil coater in a 150 μm thick film) which were substantially more transparent than colorations obtained with the comparison pigments.

EXAMPLES 3 TO 28

100 g of CuPc pigment in the form of the aqueous press cake (prepared according to German Laid-Open Application DOS 2,851,752, Example 2) were suspended in 2.5 l of water at room temperature for 2 hours. Thereafter, 5 g of basic CuPc (1) in the form of the watermoist press cake and in each case 7 g of the phosphoric ester stated in the Table below were added. The suspension was stirred for 1 hour and the formulation was isolated, dried and milled.

TABLE 1

| Example | Phosohoric ester |
|---|---|
| 3 | Monoalkyl ester based on a branched $C_6$-$C_{10}$-alkanol |
| 4 | Di-(2-ethylhexyl) phosphate |
| 5 | Acidic ester based on a product obtained by reacting a $C_{13}$-$C_{15}$-oxoalcohol with 6 moles of PO and then with 12 moles of EO per mole of oxoalcohol |
| 6 | Triisobutyl phosphate |

TABLE 1-continued

| Example | Phosohoric ester |
|---|---|
| 7 | Ester of polypropylene glycol with phosphoric acid (acidic) |
| 8 | Tricresyl phosphate |
| 9 | Plysurf ® A 207 H (DKS International Inc.) |
| 10 | Plysurf ® A 208 B |
| 11 | Plysurf ® A 212 C |
| 10 | Plysurf ® A 212 E |
| 10 | Plysurf ® A 217 E |
| 10 | Plysurf ® A 219 B |
| 15 | Mixture of mono- and diesters of the adduct of dodecanol and 3 units of EO |
| 16 | Di-(alkylphenyl) phosphate |
| 17 | Monoester of fatty alcohol/EO adducts |
| 18 | Diester of fatty alcohol/EO adducts |
| 19 | Knapsack phosphoric ester 158 (Hoechst AG) |
| 20 | Knapsack phosphoric ester 123 |
| 21 | Knapsack phosphoric ester 185 |
| 22 | Knapsack phosphoric ester 215 |
| 23 | Knapsack phosphoric ester MDAH |
| 24 | Knapsack phosphoric ester MDIT |
| 25 | Knapsack phosphoric ester MOB |
| 26 | Knapsack phosphoric ester MDB |
| 27 | Knapsack phosphoric ester MDL |
| 28 | Knapsack phosphoric ester MDST |

The pigment formulations prepared according to Examples 3 to 28 can be used to produce offset printing inks which, in contrast to a printing ink containing the Comparison 1 or 2, exhibit flow at 18% pigment concentration. The flow plate values are summarized in Tables 1 and 2.

Compared with the pigment of DE-A 28 51 752, Example 2 (Comparison 2), the pigment formulations of Examples 3 to 28 give colorations having relatively high transparency.

EXAMPLE 29 (Formulation 29)

100 g of CuPc in the form of the press cake (prepared according to Example 2 of DE-A-28 51 752) were suspended in 2.5 l of water at room temperature for 2 hours. 5 g of the water-moist press cake of a colorant (2) having an external basic group and 7 g of the acidic phosphoric ester stated in Example 5 were added.

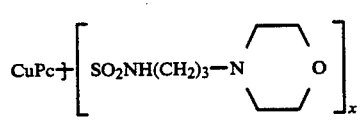

(2)

CuPC = Copper phthalocyanine, mixture of compounds in which x=2 and x=3

The suspension was stirred for 1 hour at room temperature. The pigment formulation was then isolated, dried and milled.

An offset ink obtained from the resulting pigment formulation exhibits flow at 18% pigment concentration, whereas an offset ink containing the Comparison 2 or containing the Comparison 1 does not exhibit flow or exhibits very poor flow, respectively, at this pigment concentration. The flow plate values are stated in Tables 2 and 3.

Compared with the pigment of DE-A-28 51 752, Example 2, the pigment formulation obtained gives colorations having a relatively high transparency.

EXAMPLE 30 (Formulation 30)

The procedure described in Example 29 was followed, except that the colorant of the formula 3, having an external basic group, was used.

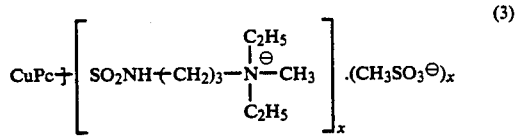

(3)

CuPc = Copper phthalocyanine, mixture of compounds in which x=2 and x=3.

The offset ink produced using the resulting formulation exhibits flow at 18% pigment concentration, without storage of the printing ink (cf. Table 1). The offset ink containing the pigment of Comparison 2 or of Comparison 1 even exhibits no flow or only very poor flow, respectively, at this pigment concentration (cf. Tables 1 and 2) without storage of the printing ink.

Compared with the pigment of Comparison 2, the pigment formulation obtained gives coatings having relatively high transparency.

EXAMPLE 31 (Formulation 31)

100 g of copper phthalocyanine in the form of the press cake (prepared according to DE-A-28 51 752, Example 2) were suspended in 2,500 ml of water at room temperature for 2 hours. Thereafter, 9 g of the colorant (1) containing an external basic group and in the form of the water-moist press cake and 12 g of the acidic phosphoric ester stated in Example 5 were added.

The suspension was stirred for 1 hour at room temperature and the formulation was then isolated, dried and milled.

An offset ink produced using Formulation 31 exhibits flow at 18% pigmentation, whereas an offset ink containing the Comparison 2 or containing the Comparison 1 exhibits no flow or only very poor flow, respectively, at this pigment concentration. The flow values are summarized in Tables 1 and 2.

Compared with the pigment of Comparison 2, the pigment formulation 31 gives colorations having relatively high transparency.

The efflux time of a halftone gravure printing ink produced according to A 4 and containing the pigment of Comparison 2 is not measurable with the 4 mm DIN cup at pigment concentrations of 12 and 8%. The corresponding gravure printing inks which were prepared using the formulations 5 and 31 have excellent flow behavior and give colorations having substantially higher gloss than a printing ink which contains the pigment of Comparison 2. Flow and gloss are summarized in Table 3. At 8% pigment concentration, the colorations exhibit 5–10% higher color density than the colorations obtained using the printing ink containing Comparison 2.

Compared with printing inks containing the pigment of Comparison 2, the inks containing formulations 15 to 28 exhibit substantially better flow, and the colorations produced therewith show identical to substantially improved gloss.

Tables 2 and 3 below summarize the flow plate values of the offset printing inks produced according to A using formulations 1 to 31 and Comparisons 1 and 2.

TABLE 2

(Flow plate values without storage of the printing ink (sec))

| Formulation | Stage 2 | Stage 3 | Stage 4 | Stage 5 |
|---|---|---|---|---|
| | is reached after sec | | | |
| Comparison 1 | 90 | — | — | — |
| 1 | 6 | 18 | 38 | 74 |
| 2 | 7 | 20 | 36 | 68 |
| 3 | 14 | 48 | 135 | 435 |
| 4 | 16 | 63 | 165 | 486 |
| 5 | 10 | 32 | 70 | 154 |
| 6 | 11 | 38 | 110 | 600 |
| 7 | 16 | 115 | 1800 | — |
| 8 | 14 | 50 | 180 | — |
| 9 | 18 | 85 | 300 | — |
| 10 | 14 | 58 | 135 | 810 |
| 11 | 16 | 63 | 240 | — |
| 12 | 11 | 43 | 126 | 900 |
| 13 | 17 | 71 | 290 | — |
| 14 | 12 | 46 | 133 | 565 |
| 15 | 15 | 47 | 145 | 430 |
| 16 | 16 | 57 | 200 | 715 |
| 17 | 10 | 35 | 90 | 230 |
| 18 | 8 | 27 | 63 | 147 |
| 19 | 8 | 25 | 57 | 145 |
| 20 | 12 | 42 | 105 | 300 |
| 21 | 11 | 41 | 154 | — |
| 22 | 10 | 36 | 74 | 190 |
| 23 | 13 | 54 | 150 | 770 |
| 24 | 8 | 30 | 65 | 170 |
| 25 | 17 | 58 | 170 | 805 |
| 26 | 21 | 90 | 248 | 1510 |
| 27 | 16 | 59 | 170 | 610 |
| 28 | 12 | 42 | 120 | 425 |
| 29 | 14 | 57 | 900 | — |
| 30 | 24 | 105 | — | — |
| 31 | 8 | 27 | 58 | 115 |

TABLE 3

Flow plate values after storage for 30 min

| Formulation | After 5 min | After 10 min | After 60 min |
|---|---|---|---|
| | stage . . . is reached | | |
| Comparison 1 | 1 | 1 | 1 |
| Comparison 2 | 1 | 1 | 1 |
| 1 | 2 | 4 | >5 |
| 2 | 5 | >5 | — |
| 3 | 2 | 2 | 2 |
| 4 | 2 | 3 | 4 |
| 5 | 4 | 5 | >5 |
| 6 | 2 | 2 | 2 |
| 7 | 1 | 1 | 2 |
| 8 | 1 | 2 | 2 |
| 9 | 1 | 2 | 2 |
| 10 | 2 | 2 | 2 |
| 11 | 1 | 2 | 2 |
| 12 | 1 | 2 | 2 |
| 13 | 1 | 2 | 2 |
| 14 | 1 | 2 | 2 |
| 15 | 1 | 2 | 3 |
| 16 | 2 | 2 | 4 |
| 17 | 2 | 2 | 4 |
| 18 | 2 | 3 | >5 |
| 19 | 1 | 2 | 4 |
| 20 | 2 | 2 | 3 |
| 21 | 1 | 1 | 2 |
| 22 | 2 | 2 | 4 |
| 23 | 2 | 2 | 3 |
| 24 | 2 | 2 | 3 |
| 25 | 1 | 2 | 2 |
| 26 | 1 | 2 | 2 |
| 27 | 1 | 2 | 2 |
| 28 | 1 | 2 | 2 |
| 29 | 1 | 2 | 2 |
| 30 | 1 | 1 | 1 |
| 31 | 5 | >5 | — |

TABLE 4

Flow and transparency of halftone printing inks

| Ink containing formulation | Gloss | Efflux time in sec (measured using DIN cup with 4mm nozzle) at pigment content 12% | 8% |
|---|---|---|---|
| Comparison 1 | 49 | 53.8 | 19.7 |
| Comparison 2 | 40 | n.m.[1] | n.m.[1] |
| 5 | 63 | 29.4 | 18.3 |
| 31 | 62 | 31.1 | 18.6 |
| 15 | 58 | 31.8 | 19.0 |
| 16 | 57 | 31.2 | 18.8 |
| 17 | 56 | 32.2 | 19.1 |
| 18 | 55 | 31.2 | 19.2 |
| 19 | 53 | 31.0 | 18.1 |
| 20 | 53 | 29.4 | 18.8 |
| 21 | 52 | 34.8 | 18.4 |
| 22 | 56 | 28.3 | 17.8 |
| 23 | 49 | 29.0 | 17.8 |
| 24 | 53 | 26.3 | 17.4 |
| 25 | 49 | 26.2 | 17.4 |
| 26 | 49 | 26.7 | 17.7 |
| 27 | 50 | 24.1 | 17.3 |
| 28 | 51 | 26.0 | 17.6 |

[1] n.m. = not measurable

EXAMPLE 32 (Formulation 32)

93 g of copper-phthalocyanine of the β-modification, in the form of the aqueous press cake (prepared by milling with salt), were suspended, together with 2 g of the colorant (1) in the form of the press cake for two hours at room temperature in 1 l of $H_2O$. Thereafter, 4 g of the acidic phosphoric ester stated in Example 5 were added and the mixture was stirred for a further 10 minutes. The pigment formulation was then isolated, dried and milled.

EXAMPLE 33 (Formulation 33)

The procedure described in Example 32 was followed, except that 4 g of the colorant (1) and 8 g of the acidic phosphoric ester were used.

COMPARATIVE EXAMPLE 3 (Comparison 3)

The procedure described in Example 32 was followed, except that no acidic phosphoric ester was added.

COMPARATIVE EXAMPLE 4 (Comparison 4)

The procedure described in Example 33 was followed, except that no acidic phosphoric ester was added.

The pigment formulations 32 and 33 can be used to produce offset printing inks which, at 30% pigment concentration, exhibit substantially better flow than a printing ink containing 30% of the corresponding uncoated pigment. After storage, the printing ink containing the uncoated pigment no longer exhibits flow, whereas the printing inks produced using pigment formulations 32 and 33 do exhibit flow. The flow plate values are summarized in Tables 5 and 6.

Printing inks containing formulations 32 and 33 exhibit, without storage, substantially better flow at 30% pigment concentration than those containing Comparisons 3 and 4. After storage, the inks of Comparisons and 4 no longer exhibit flow. Compared with the ink containing Comparison 2, the pigment formulations 32 and 33 give colorations having high transparency.

TABLE 5

Flow plate values without storage of the printing ink (sec)

| Ink containing formulation | Stage 2 | 3 | 4 | 5 |
|---|---|---|---|---|
| | is reached after sec | | | |
| 32 | 38 | 140 | 345 | 940 |
| 33 | 35 | 95 | 210 | 465 |
| Comparison 2 | 2580 | — | — | — |
| Comparison 3 | 195 | — | — | — |
| Comparison 4 | 159 | — | — | — |

TABLE 6

Flow plate values after storage of the printing ink after 30 min

| Ink containing formulation | After 10 min | 30 min | 60 min |
|---|---|---|---|
| | stage ... is reached | | |
| 32 | 2 | 3 | 4 |
| 33 | 4 | 5 | >5 |
| Comparison 2 | 1 | 1 | 1 |
| Comparison 3 | 1 | 1 | 1 |
| Comparison 4 | 1 | 1 | 1 |

EXAMPLE 34 (Comparison 34)

50 g of the β-modification of copper phthalocyanine pigment, which consists of isometric particles of 0.25 μm and is in the form of the press cake (prepared by finishing a crude copper phthalocyanine dry-milled in the presence of $Na_2SO_4$, a mill base of 25% of α- and 75% of β-modification being obtained, in a mixture of ethylene glycol monobutyl ether and water) were suspended in 1250 parts of water at room temperature with 4.5 g of the colorant (1) in the form of the press cake for two hours.

After the addition of 9 g of the acidic phosphoric ester stated in Example 5, the suspension was stirred for one hour at room temperature. After filtration, the pigment formulation was dried and milled.

The coatings of a nitrocellulose printing ink produced according to A 5 (8% pigment concentration) on transparent film and aluminum foil had substantially higher transparency compared with those of a corresponding printing ink containing Comparison 2. The printing ink containing pigment formulation 34 also had superior gloss on transparent film (88 points instead of 70 points for the Comparison) and on halftone paper (53 points instead of 28 points).

EXAMPLE 35 (Formulation 35)

115 g of C.I. Pigment Yellow 13 (C.I. No. 21,100) in the form of the aqueous press cake (prepared and coated with 30% of Ca resinate according to the prior art) were suspended for two hours in 2,000 ml of water at room temperature, after which 26 g of a 20% strength aqueous solution of dye (4) were added.

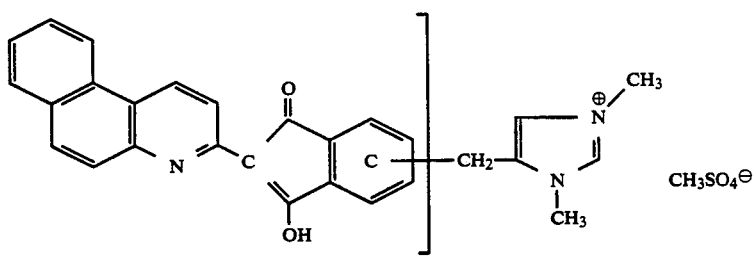

(4)

After the addition of 10.4 g of the acidic phosphoric ester stated in Example 5, the mixture was stirred for a further one hour at room temperature. The pigment formulation was then isolated, dried and milled.

COMPARATIVE EXAMPLE 5 (Comparison 5)

The procedure described in Example 35 was followed, except that no phosphoric ester was added.

The colorations obtained with a nitrocellulose printing ink produced using Formulation 35 according to A 5 (8% pigment concentration) had substantially higher transparency on transparent film and aluminum foil compared with those of a corresponding printing ink containing Comparison 5 or the uncoated pigment. The printing ink containing pigment formulation 35 also had superior gloss on transparent film (46 points instead of 22 points) and on halftone paper (17 points instead of 8 points). The coloration obtained with the ink containing Comparison 5 had a gloss of 16 on transparent film and of 7 on halftone paper.

EXAMPLE 36

150 g of Pigment Red 57:1 (C.I. No. 15850:1) in the forth of the press cake (prepared by a prior art process and coated with 15%, based on pigment, of Ca resinate) were suspended in 3,500 ml of water at room temperature for two hours.

Thereafter, 6.7 g of colorant (5) in the form of the aqueous press cake and 13.5 g of the acidic phosphoric ester stated in Example 5 were added.

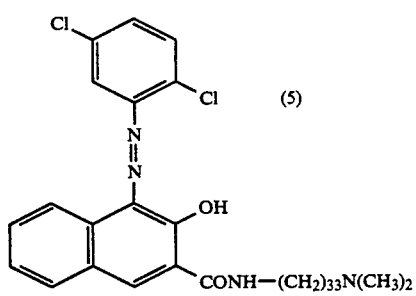

(5)

The suspension was stirred for a further 1 hour (room temperature), after which the formulation was isolated, dried and milled.

COMPARATIVE EXAMPLE 6 (Comparison 6)

The procedure described in Example 36 was followed, except that no phosphoric ester was added.

The offset ink produced according to A1 using formulation 36 (18% pigment concentration) exhibited better flow tan the ink using the starting pigment or Comparison 6. Compared with the colorations obtained using the ink containing the starting pigment, those obtained using pigment 36 gave coating of higher transparency.

TABLE 7

| Flow plate values without storage of the printing ink | | | | |
|---|---|---|---|---|
| | Stage | | | |
| Ink containing formulation | 2 | 3 | 4 | 5 |
| | is reached after sec | | | |
| Comparison 6 | 40 | 137 | 310 | 720 |
| Starting pigment | 35 | 120 | 250 | 540 |
| Formulation 36 | 19 | 65 | 135 | 290 |

TABLE 8

| Flow plate values after storage for 30 min | | | |
|---|---|---|---|
| | After | | |
| Ink containing formulation | 2 min | 10 min | 15 min |
| | stage . . . is reached | | |
| Comparison 6 | 2 | 4 | 4 |
| Starting pigment | 2 | 4 | 5 |
| Formulation 36 | 3 | 5 | >5 |

We claim:
1. A pigment formulation, comprising:
a) a finely divided pigment,
b) from 1 60 20% by weight, based on the formulation, of at least one colorant which has at least one external basic group that is a compound of the formula: (I):

$$F-Z-X]_n \qquad (I)$$

wherein F is an n-valent radical of a water-soluble or water-insoluble colorant, n is from 1 to 4, and
wherein Z is a moiety of the formula:

$$-Y-A-CH_2)_m$$

wherein Y is $-CH_2)_p$, $-SO_2-$ or $-CO-$, A is a chemical bond, $$-O-, -\overset{|}{\underset{}{N}}-R^1, -\overset{H}{\underset{}{N}}-CO- \text{ or } -CO-O-,$$

$R^1$ is H, $C_1$-$C_{20}$-alkyl or alkoxyalkyl having a total of 3 to 6 carbon atoms, p is from 1 to 6 and m is from 0 to 6; and X is a radical of the formula:

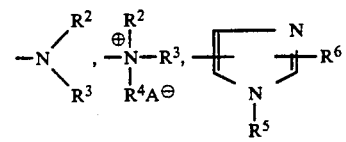

-continued

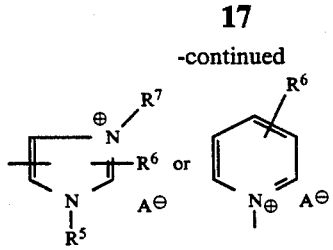

wherein $R^2$ and $R^3$, independently of one another are each H, $C_1-C_{20}$-alkyl, alkoxyalkyl having a total of 3 to 8 carbon atoms, $C_2-C_{18}$-hydroxyalkyl or $C_3-C_{18}$-alkenyl, or one of the radicals $R^3$ or $R^2$ is benzyl or phenyl which is unsubstituted or substituted by $C_1-C_4$-alkoxy, $C_1-C_4$-alkyl or chlorine, $R^4$ is H, $C_1-C_{20}$ alkyl, $C_1-C_{18}$-hydroxyalkyl or alkoxyalkyl having a total of 3 to 8 to carbon atoms, $R^5$ and $R^6$, independently of one another, are each H, or $C_1-C_4$-alkyl, $R^7$ is $C_1-C_4$-alkyl or hydroxy-$C_1-C_4$-alkyl and $A^\ominus$ is one equivalent of an anion; and c) from 3 to 30% by weight, based on the formulation, of at least one phosphoric ester from the group consisting of dialkyl, trialkyl, diaryl, triaryl and alkylaryl phosphates; or at least one phosphoric ester selected from the group consisting of the acidic or neutral phosphoric esters based on fatty alcohol/ethylene oxide adducts, fatty alcohol/propylene oxide adducts, polypropylene glycol, polyethylene glycol or of block copolymers based on propylene oxide and ethylene oxide.

2. The pigment formulation as claimed in claim 1, wherein (b) is derived from the pigment used as (a) or from a compound of this group.

3. The pigment formulation as claimed in claim 1, wherein F is derived form monoazo dyes, from disazo dyes, from phthalocyanines, from quinophthalones, from indigoids, from phenyl-containing anthraquinone dyes, from carbonyl dyes having a relatively high degree of fusion, from carbonyl-containing dyes, from perylene-3,4,9,10-tetracarboxylic acid diimides or from naphthalene-1,4,5,8-tetracarboxylic acid diimides, and F may carry a sulfo group.

4. The pigment formulation as claimed in claim 1, which contains form 3 to 15% by weight of b) and from 5 to 20% by weight of c).

5. A method of preparing a pigmented printing ink or coating, which comprises mixing the pigment formulation of claim 1 into a base printing ink or coating.

* * * * *